United States Patent

[11] 3,560,756

[72] Inventor Edward F. Labuda
New Providence, N.J.
[21] Appl. No. 755,990
[22] Filed Aug. 28, 1968
[45] Patented Feb. 2, 1971
[73] Assignee Bell Telephone Laboratories, Incorporated
Murray Hill, N.J.
a corporation of New York

[54] OPTICAL STORAGE DEVICE WITH SOLID STATE LIGHT ACTUATED SCANNING MEANS FOR SOLID STATE OUTPUT MEANS
5 Claims, 3 Drawing Figs.

[52] U.S. Cl. .......... 250/217, 317/237, 178/7.6, 313/65
[51] Int. Cl. .......... H04n 3/14, H01l 3/12
[50] Field of Search .......... 250/208, 217, 217 (S.S.L.); 313/65A, 65AB, 66; 178/7.6

[56] References Cited

UNITED STATES PATENTS

| | | | |
|---|---|---|---|
| 3,011,089 | 11/1961 | Reynolds | 313/65X |
| 3,403,284 | 9/1968 | Buck et al. | 313/65X |
| 3,415,996 | 12/1968 | Grimmeiss | 250/217 |
| 3,423,623 | 1/1969 | Wendland | 313/65X |
| 3,433,994 | 3/1969 | Gibson, Jr. | 313/65X |

*Primary Examiner*—Roy Lake
*Assistant Examiner*—V. Lafranchi
*Attorneys*—R. J. Guenther and Arthur J. Torsiglieri

ABSTRACT: One surface of the target of a television camera device is scanned by a light beam, with light to be recorded being imaged on the opposite surface. The target comprises a substrate having a diode array on one side with a photoconductive layer being sandwiched between a transparent conductive film and the diode array. A voltage on the conductive film reverse biases the diodes. During one frame time, the diodes discharge as a function of light intensity imaged on the substrate. The scanning light beam recharges the diodes by increasing the localized conductivity of the photoconductive layer, and thus generates a video signal output.

INVENTOR
E.F. LABUDA
BY
Roderick B Anderson
ATTORNEY

OPTICAL STORAGE DEVICE WITH SOLID STATE LIGHT ACTUATED SCANNING MEANS FOR SOLID STATE OUTPUT MEANS

BACKGROUND OF THE INVENTION

This invention relates to optical storage devices such as television camera devices.

The copending application of Buck et al., Ser. No. 605,715, filed Dec. 29, 1966, which is now U.S. Pat. No. 3,403,284, issued Sept. 24, 1968, and assigned to Bell Telephone Laboratories, Incorporated, describes a television camera tube comprising a semiconductor wafer having on one side an array of junction diodes that are periodically scanned by an electron beam. The electron beam reverse biases the diodes, and during the period between successive beam impingements, the voltage on the diodes decays as a function of the localized light intensity to which they are exposed. When the beam returns to its successive scan, the diodes are recharged to their initial reverse-bias voltage which causes a current to flow to the semiconductor wafer. The varying currents flowing to the semiconductor wafer during the electron beam scan are proportional to the distributed light intensity along the wafer and are therefore taken as the video output.

The Buck et al. device is a major improvement over conventional vidicon television camera tubes because, among other reasons, it permits the use of targets made of such materials as silicon, which are more durable and more amenable to vacuum tube processing techniques than those used in conventional vidicons. Nevertheless, many of the complexities common to most electron tubes, such as the need for a thermionic cathode and a vacuum envelope, are inherent in the device.

The copending application of Hakki, Ser. No. 638,417, filed May 15, 1967 now U.S. Pat. No. 3,536,830 and assigned to Bell Telephone Laboratories, Incorporated, describes a solid-state optical storage device comprising an array of semiconductor piezoelectric strips each having an array of light sensitive diodes along one surface, upon which light to be recorded is imaged. Acoustic domains, which are each accompanied by a high electric field, successively scan the diodes to generate a video signal indicative of the light to which successive diodes have been subjected. This device has not yet been used commercially, and one problem encountered in its development is the interdependence of the light sensing function and the scanning function; when the device is constructed to optimize scanning, the light sensing capability may be deleteriously affected, and vice versa.

SUMMARY OF THE INVENTION

In accordance with an illustrative embodiment of the invention, a television camera device comprises a semiconductor target, one surface of which is scanned by a light beam, with light to be recorded being imaged on the opposite surface. The target comprises a substrate having a diode array on one side with a photoconductive layer being sandwiched between a transparent conductive film and the diode array. A voltage on the conductive film reverse biases the diodes and the resistance of the photoconductive layer is assumed to be large enough so that a negligible current flows in the absence of the scanning light beam. During one frame time, the diodes discharge as a function of the light intensity imaged on the substrate. The scanning light beam increases the localized conductivity of the photoconductive layer, thereby recharging the diodes and generating a video signal output. The light beam may be caused to raster scan the target through the use of any of a number of light deflection apparatus such as acoustic deflection cells or rotating mirrors.

In another embodiment of the invention, the scanning light is produced by an array of semiconductor piezoelectric strips arrayed in the manner described in the Hakki application. Arranged along one surface of each strip are an array of light emitting diodes which are closely adjacent to the photoconductive layer of the target structure. As the acoustic domain scans the diodes successive bursts of light are released, which impinge on the photoconductive layer, and which together constitute the equivalent of a scanning light beam.

Both embodiments are advantageous over the Buck et al. device in that the problems inherent in electron tube fabrication and operation are avoided. The invention is also advantageous over the Hakki device in that the scanning structure is substantially independent of the target structure. Moreover, in accordance with another embodiment of the invention, a lens may be included between the scanning structure and the target structure for both focusing the light emitted by the scanning structure and for altering the speed of the scanning light on the photoconductive layer to a value which is higher or lower than the speed of the acoustic domains in the scanning structure.

These and other objects, features and advantages of the invention will be better understood from a consideration of the following detailed description taken in conjunction with the accompanying drawing.

DRAWING DESCRIPTION

DETAILED DESCRIPTION

Figure 1:
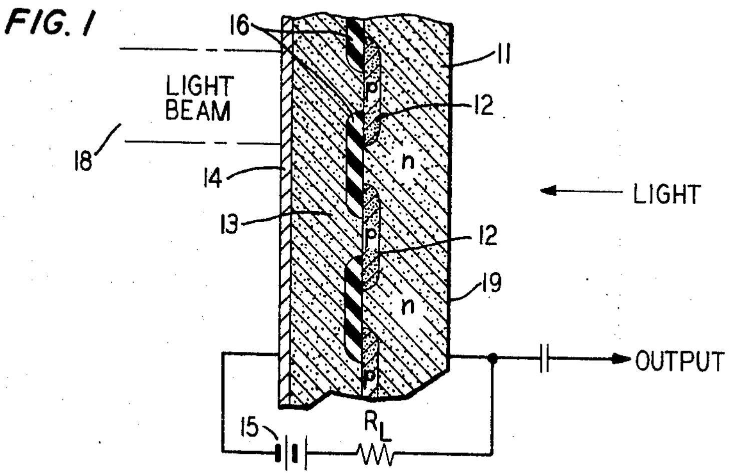
FIG. 1 is a schematic view of an illustrative embodiment of the invention.

Referring now to FIG. 1, there is shown an optical storage apparatus that may be used as a television camera device which comprises a semiconductor wafer substrate 11, upon one surface of which has been formed an array of diodes 12. A layer 13 of photoconductive material overlays the diodes and is coated on one surface by a conductive film 14. The conductive film is biased with respect to the substrate by a battery 15.

If the device is used as a television camera device, the diode array 12 extends in two dimensions and may be formed in the manner described in the aforementioned Buck et al. application; that is, the substrate 11 may be *n*-type silicon in which circular *p* regions are formed to define the diodes 12. An insulative coating 16, which may be of silicon dioxide, overlaps and separates the various *p* regions.

The transparent film 14 is raster scanned by a light beam 18. The periodic deflection of a light beam in a line and frame sequence to give raster scanning is a matter which is known in the art. For example, the copending application of E. I. Gordon, Ser. No. 377,353, filed June 23, 1964, which is now U.S. Pat. No. 3,413,476 issued Nov. 26, 1968, and assigned to Bell Telephone Laboratories, Incorporated, describes acousto-optic deflection devices that can be used for this purpose. The copending application of T. J. Nelson, Ser. No. 239,948, filed Nov. 26, 1962, (now abandoned) and assigned to Bell Telephone Laboratories, Incorporated, describes electro-optic deflection devices. Moreover, as is known, appropriately designed rotating mirrors can also be used to give raster scanning of a light beam.

Since layer 13 is photoconductive, impingement of the light beam reduces the local resistance between the conductive film 14 and a given diode 12. As a result, the voltage on the conductive film 14 charges the diode to a reverse-bias condition. Hence, as the light beam scans the array, the diodes 12 are successively reverse biased.

Incoming light to be recorded is imaged on the substrate surface 19 opposite the diodes and creates in the substrate electron-hole pairs. The minority carriers thus created in the substrate diffuse to the depletion regions of the reverse-biased diodes and discharge the diodes, or in other words, reduce the reverse-bias diode voltage, in proportion to the local light intensity. The mechanism of diode discharge by imaged light is identical to that employed by the Buck et al. application.

After the characteristic frame time, the scanning light beam returns to again reverse bias the various diodes as described before The local resistivity of the photoconductive layer is reduced and a current flows through the photoconductive layer to recharge the diode in proportion to the extent of discharge of the diode over the frame time. This recharging current flows through a load resistor $R_L$ and generates a voltage which is taken as the output video signal as shown by the output arrow. As the light beam scans successive diodes, the recharging current flow through the photoconductive layer 13 varies in proportion to the light intensity to which the successive diodes have been subjected, and as a result, the output video signal is proportional to the distributed light intensity incident on surface 19 of substrate 11.

Various refinements described in the Buck et al. application are likewise applicable to the structure of FIG. 1. For example, the substrate 11 should preferably be less than one diffusion length thick in order to permit a large proportion of the generated minority carriers to diffuse to the depletion regions of the diodes. Various techniques described in the application may be used to inhibit deleterious recombination at surface 19.

The resistivity and thickness of the photoconductive layer should be designed with respect to the scanning rate of the light beam to permit each successive diode to be almost fully recharged during the time at which the light beam impinges the conductive film opposite the diode. If the diode is not fully recharged during light beam impingement, the response time of the photoconductor should be sufficiently fast so that no appreciable current flows through layer 13 after the scanning light beam has left; any current that does flow will contribute to a loss in resolution of the camera device. The design of specific photoconductor parameters to meet these requirements is within the ordinary skill of a worker in the art.

Figure 2:
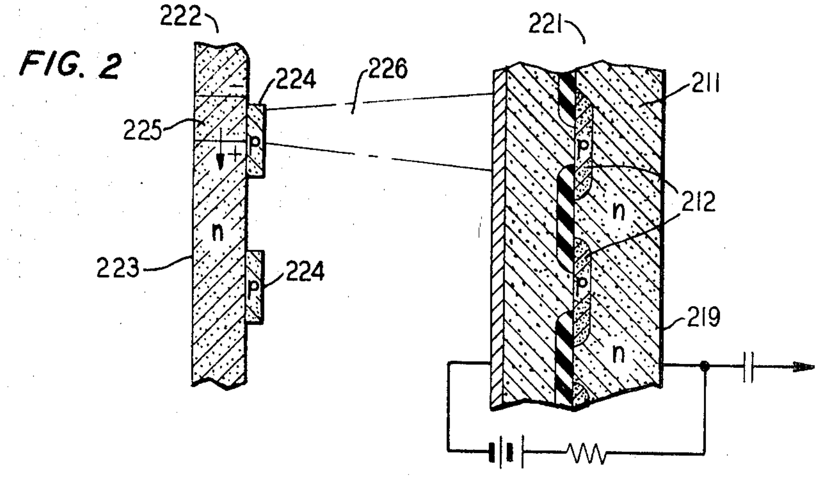
FIG. 2 is a schematic illustration of another embodiment of the invention.

The aforementioned copending application of Hakki describes, in addition to the light-sensitive device mentioned before, a solid state display device comprising a plurality of semiconductor-piezoelectric strips, each including an array of light-emitting diodes along an upper surface. An acoustic or high electric field domain is formed in each of the strips which successively scans the light emitting diodes to release output light. The bias voltages on the diodes are appropriately modulated to produce a constructed image. As illustrated in FIG. 2, the Hakki light emitting elements are admirably suited for producing the equivalent of a scanning light beam.

The apparatus of FIG. 2 comprises a target structure 221 which is essentially identical to that of FIG. 1 and a scanning light source 222 comprising a semiconductor-piezoelectric strip 223 which includes a plurality of light emitting elements 224. As described in the Hakki application, the strip 223 may be *n*-type cadmium sulfide with a carrier concentration of $10^{16}$ $-10^7$ carriers/centimeters$^3$ and elements 224 may be *p*-type cadmium sulfide with a carrier concentration of $10^{17}$ carriers/centimeter$^3$ which each form a junction diode with the strip 223. When an appropriate voltage is applied along the strip 223, a high electric field domain 225 is generated which successively scans the light emitting elements to generate bursts of light 226. The successive bursts of light 226 constitute the equivalent of a scanning light beam which recharges the diodes 212 in the same manner described before. If the storage device is to be used as a television camera tube, a plurality of strips 223 are used in which traveling domains 225 are successively formed in the manner described in the Hakki application to give the equivalent of raster scanning. Light energy to be recorded is of course imaged on surface 219 as described previously.

It is to be understood that the embodiments described are not limited to use as television camera devices. For example, the light impinging on surface 19 of FIG. 1 and surface 19 of FIG. 2 may constitute digital optical information which is to be stored by the diodes for subsequent readout by the scanning light beam. The density of the diodes 12 which are used depends of course on the use to which the optical storage device is to be put and the resolution which is required.

As mentioned before, the device of FIG. 1 is advantageous with respect to similar devices using electron beams in that the problems incident to the use of a scanning electron beam are avoided. In the apparatus of FIG. 2, the parameters of the scanning structure 222 may be optimized independently of the parameters of the target structure 221, and for this reason, it is advantageous with respect to the corresponding television camera device described in the Hakki application.

The Hakki application points out that care must be taken to choose materials and modes of operation that will give a proper scanning rate. For example, semiconductor strips 223 may be made of two-valley semiconductor material for giving Gunn-effect traveling domains which generally propagate at a higher velocity than the acoustic traveling domains formed in cadmium sulfide. In accordance with the principals shown in FIG. 3, the scanning rate can also be modified by optical means.

Figure 3:
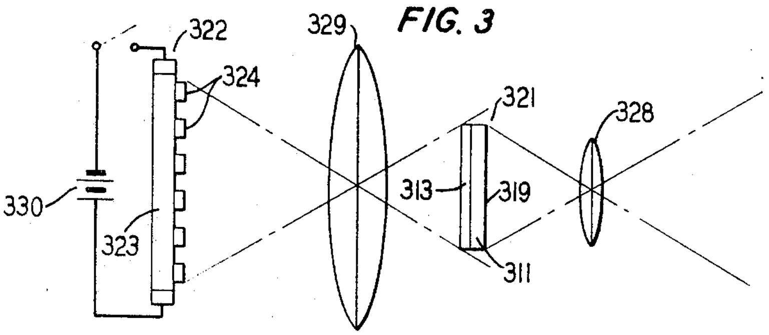
FIG. 3 is a schematic illustration of still another embodiment of the invention.

The embodiment of FIG. 3 includes a scanning structure 322 comprising a semiconductor-piezoelectric strip 323 and a plurality of light emitting elements 324, and a target structure 321 comprising a wafer substrate 311 and a photoconductive layer 313. A voltage applied across the strip 323 by a voltage source 330 causes a high field domain to travel along the strip as in the FIG. 2 embodiment. Light to be recorded is imaged onto surface 319 of the target structure by a lens 328.

The entire area encompassed by the light emitting elements 324 is imaged by a lens 329 onto the target structure 321. As a result, the light emitted by successive elements 324 is imaged onto the target structure. However, because the lens 329 reduces in size the image of the scanning structure as projected onto the target structure, it also reduces the velocity at which emitted light scans the target structure with respect to the actual scanning velocity of the scanning structure. That is, the velocity at which light scans the photoconductive layer 313 is lower than the velocity at which a traveling domain propagates along the semiconductor strip 323. Moreover, the lens 329 intensifies or focuses emitted light onto the target structure 321.

If so desired, the lens 329 could be designed to enlarge the image of the scanning structure which is projected onto the target structure. This of course would also magnify or increase the effective velocity of the scanning light beam. Lens 329 is, however, considered to be primarily useful for reducing the velocity of the scanning light beam and increasing its intensity. As with the apparatus of FIG. 2, the FIG. 3 apparatus may comprise a plurality of strips 323, and it is intended that the light elements of all such strips would be imaged by the lens 329 onto the target structure.

The foregoing embodiments are intended to be merely illustrative. Various other embodiments and modifications may be made by those skilled in the art without departing from the spirit and scope of the invention. For example, while the target structures are shown as comprising an *n*-type substrate, *p*-type substrates in conjunction with discrete *n*-type regions could alternatively be used with the applied bias voltage being of opposite polarity.

I claim:

1. Optical storage apparatus comprising:
   an array of diodes;
   a photoconductive layer overlaying the diodes;
   means for reverse biasing the diodes comprising a film of substantially transparent conductive material overlaying the photoconductive layer;
   means for directing light onto the diodes, thereby to discharge various diodes as a function of light intensity; and
   means for periodically scanning the transparent conductive film with confined light energy, thereby increasing the conductivity between the conductive film and the diodes to recharge the diodes.

2. The storage apparatus of claim 1 wherein: the scanning means comprises at least one semiconductor strip characterized by a capacity for propagating a high electric field traveling domain in response to an appropriately applied voltage, and a plurality of light emitting elements disposed along one surface of the semiconductor strip.

3. The optical storage apparatus of claim 2 further comprising: means for altering the scanning velocity of the confined light energy comprising a lens disposed between the light emitting elements and the transparent conductive film.

4. The optical storage apparatus of claim 3 wherein:

the diode element array has an area which is smaller than the area of the light imaging element array; and the lens constitutes means for forming an image of the light imaging element array on the conductive film which has an area approximately equal to the area of the diode element array, whereby the scanning velocity of the confined light energy on the conductive film is smaller than the velocity of a traveling domain in the semiconductor strip.

5. The optical storage apparatus of claim 1 further comprising:

a flat substrate of semiconductor material of a first conductivity type having first and second opposite surfaces;

means for imaging light to be stored on the first surface of the substrate; and wherein the array of diode elements comprises an array of regions of a second conductivity type included on the second surface of the substrate.